United States Patent [19]

Kubota

[11] 4,388,376
[45] Jun. 14, 1983

[54] MAGNETIC RECORDING MEDIUM

[75] Inventor: Yuichi Kubota, Tokyo, Japan

[73] Assignee: TDK Electronics Co., Ltd., Tokyo, Japan

[21] Appl. No.: 158,353

[22] Filed: Jun. 11, 1980

[30] Foreign Application Priority Data

Jun. 25, 1979 [JP] Japan ................... 54-79937

[51] Int. Cl.³ ............................................. G11B 5/68
[52] U.S. Cl. .............................. 428/425.9; 252/62.54;
360/134; 360/135; 360/136; 427/128; 428/522;
428/694; 428/900
[58] Field of Search ............ 428/900, 694, 695, 425.9,
428/423.7, 522; 252/62.54; 360/134, 135, 136;
427/128

[56] References Cited

U.S. PATENT DOCUMENTS

| | | | |
|---|---|---|---|
| 3,149,995 | 9/1964 | Bauer .................................. | 428/900 |
| 3,404,997 | 10/1968 | Jacobsen ........................ | 252/62.54 |
| 3,728,262 | 4/1973 | Lemmen et al. ................. | 252/62.54 |
| 3,929,659 | 12/1975 | Graham ............................ | 252/62.54 |
| 4,018,967 | 4/1977 | Roller et al. ...................... | 428/425.9 |
| 4,234,438 | 11/1980 | Horigome et al. ............... | 252/62.54 |
| 4,340,644 | 7/1982 | Ota et al. ........................... | 428/423.7 |

FOREIGN PATENT DOCUMENTS

| | | | |
|---|---|---|---|
| 974627 | 4/1964 | United Kingdom ............ | 252/62.54 |
| 1102968 | 2/1968 | United Kingdom ............ | 252/62.54 |
| 2017117A | 10/1979 | United Kingdom . | |
| 627528 | 1/1977 | U.S.S.R. . | |

*Primary Examiner*—Stanley S. Silverman
*Attorney, Agent, or Firm*—Oblon, Fisher, Spivak, McClelland & Maier

[57] ABSTRACT

A magnetic recording medium comprises a substrate coated with a magnetic powder composition comprising a magnetic powder and an organic binder having a main component of vinyl chloride-vinyl alcohol copolymer.

7 Claims, No Drawings

MAGNETIC RECORDING MEDIUM

BACKGROUND OF THE INVENTION

1. Field of the Invention

The present invention relates to a magnetic recording medium which comprises a substrate such as a base film made of a polyester film, aluminum metal or a dram which is coated with a magnetic powder composition dispersing a magnetic powder in an organic binder.

2. Description of the Prior Arts

Heretofore, in the preparation of a magnetic recording medium such as a magnetic tape, a magnetic card and a magnetic disc, it has been studied to industrially prepare magnetic recording media by using an organic binder and a magnetic powder such as $\gamma\text{-}Fe_2O_3$, $Fe_3O_4$, cobalt ion-adsorbed or doped iron oxide or a metal oxide containing $CrO_2$, Fe, Co, Fe-Co or Ni or a metallic acicular fine powder.

Recently, it has been required to give higher recording density of a signal required for a magnetic recording medium such as the recording density in a region of 1 μm of the minimum recording wavelength as required by home VTR (video tape recorder) or high characteristic audio-cassette tape.

In order to satisfy such requirements, a magnetic powder having further fine size has been used for such fine particle dispersion type magnetic recording medium since the magnetic uniformity of the magnetic recording medium is improved by reducing a particle size of the magnetic powder so as to satisfy the requirement for the high density recording medium.

On the other hand, an organic binder having superior affinity to the magnetic fine powder is required depending upon reducing the particle size of the magnetic powder. It has been difficult to satisfy with the requirement by using the binder used in the conventional technology. The affinity of the organic binder to the magnetic powder relates to a dispersibility of the magnetic powder in the magnetic powder composition or membrane and it highly affects to a reliability and durability when it is used for the magnetic recording medium. The organic binders used in the conventional technology have not enough affinity and have not enough toughness as a mechanics of a polymer.

SUMMARY OF THE INVENTION

It is an object of the present invention to provide a magnetic recording medium which has high affinity of an organic binder to a magnetic powder and also has excellent reliability and durability.

The foregoing and other objects of the present invention have been attained by providing a magnetic recording medium comprising a substrate coated with a magnetic powder composition comprising a magnetic powder and an organic binder having a main component of a vinyl chloride-vinyl alcohol copolymer obtained by hydrolyzing acetyl group of vinyl acetate in a vinyl chloride-vinyl acetate copolymer.

DETAILED DESCRIPTION OF THE PREFERRED EMBODIMENTS

In order to improve an affinity of an organic binder to the magnetic fine powder, it is necessary to impart hydrophilic property of the surface of the magnetic fine powder such as metal oxide or alloy fine powder, to the organic binder. Moreover, it is necessary to introduce many functional groups for forming hydrogen bonds in the side chains of the polymer for the organic binder.

In particularly, it is advantageous to use a linear polymer having higher ratio of pendant hydroxyl groups bonded to the main chain of the polymer.

In order to firmly bond the organic binder to the magnetic fine powder, it is advantageous to control Young's modulus, breaking tensile strength, elongation, wearing resistance and coefficiency of friction by a polymer blend of a polymer having high glass transition temperature and a polymer having elasticity which have molecular weights so as to be dissolved in an organic solvent for a paste.

It is especially possible to further improve the mechanical strength of the polymer by forming a crosslinkage structure of urethane bonds by a combination of a polymer, a prepolymer or a crosslinking agent which has reactive functional groups such as isocyanate group with reactive hydroxyl groups or by converting the reactive hydroxyl group into urethane bonds so as to improve physical properties, reliability and durability of the magnetic recording medium to humidity.

In order to attain said object, it is effective to use vinyl chloride-vinyl alcohol copolymer having high content of vinyl alcohol component, so as to improve the known technology to use vinyl chloride-vinyl acetate copolymers or vinyl chloride-vinyl acetate-vinyl alcohol copolymer as the organic binder for the conventional magnetic recording medium.

Vinyl alcohol group imparts superior affinity for the magnetic powder to that of vinyl acetate. Vinyl alcohol component imparts excellent characteristics such as higher glass transition temperature and smaller variation of Young's modulus. Therefore, acetyl groups of the vinyl acetate component are converted into vinyl alcohol groups by the hydrolysis.

In the preparation, the vinyl chloride-vinyl acetate copolymer which has been produced as a resin for paints by a mass-production is used as a starting material. The acetyl groups of the vinyl acetate component are hydrolyzed to obtain the vinyl chloride-vinyl alcohol copolymer.

In accordance with this process, the vinyl chloride-vinyl acetate copolymer as the starting material is economical and can be easily treated in a powdery form in excellent processibility.

In order to increase vinyl alcohol groups in the resulting vinyl chloride-vinyl alcohol copolymer and to prevent a decomposition by a dehydrochlorination of the resulting copolymer to maintain high stability, it is especially effective to use a vinyl chloride-vinyl acetate copolymer having a ratio of vinyl chloride to vinyl acetate ranging from 85/15 to 70/30.

The polymerization degree $\bar{p}$ of the vinyl chloride-vinyl acetate copolymer is preferably in a range of about 250 to 800 so as to increase the solubility of the resulting vinyl chloride-vinyl alcohol copolymer and the dispersibility as the medium and the glass transition temperature thereof and to impart suitable strength and rigidity and to increase the chemical stability.

Certain examples of a hydrolysis of vinyl chloride-vinyl acetate copolymer will be described.

Hydrolysis 1:

Vinyl chloride-vinyl acetate copolymer having a ratio of vinyl chloride groups to vinyl acetate groups of 75/25 and an average polymerization degree $\bar{p}=400$ was suspended in a mixed medium of water and methyl isobutyl ketone (MIBK). The mixture was mechanically dispersed by a stirrer to swell the resin and to prepare a slurry-like suspension. A mixture of sodium hydroxide-sodium methylate as a catalyst was added to the suspension to hydrolyze acetyl groups of vinyl acetate component to form hydroxyl groups.

It is possible to incorporate a stabilizer for preventing dehydrochlorination or a suspension for uniformly suspending the polymer. Acetic acid formed by the separation of acetyl group and the catalyst and residual sodium hydroxide were removed by washing the slurry to neutralize after the hydrolysis so as to increase the stability of the resin. If necessary, it is possible to apply a decoloring step by using the organic peroxide such as benzoylperoxide so as to prevent a coloring caused by the hydrolysis.

The characteristics of the vinyl chloride-vinyl alcohol copolymer obtained by the hydrolysis 1 are as follows:

Vinyl chloride content: 87%
Vinyl acetate content: less than 0.3%
Vinyl alcohol content: 12.6%
Polymerization degree: $\bar{p}=330$ Hydrolysis 2:

The same vinyl chloride-vinyl acetate copolymer used in Hydrolysis 1 was used as a raw material. The resin was dissolved in a mixture of methyl isobutyl ketone and toluene of 1:1 at a concentration of 40 wt.% and methanol was added at a ratio of 10 wt.% and a concentrated anhydrous hydrochloric acid catalyst was added and the mixture was heated in an autoclave at the boiling point of methyl isobutyl ketone whereby acetyl groups of vinyl acetate component were converted into hydroxyl groups so as to hydrolyze it into vinyl chloride-vinyl alcohol copolymer. The solution is neutralized by propylene oxide.

The solution of the vinyl chloride-vinyl alcohol copolymer in the mixture of methyl isobutyl ketone and toluene (1:1), included the unreacted methanol, acetic acid and the other by-products formed by the reaction. The solution was heated at about 70° C. under a reduced pressure so as to separate methanol, acetic acid, water and the catalyst until reducing the residual methanol to 0.01%.

The decoloring step is carried out by benzoylperoxide under the heating. The polymer was admixed with a mixed solvent of methyl isobutyl ketone and toluene of 1:1 to adjust a concentration of the polymer of 25 wt.%. When a stabilizer such as dibutyltin-diphthalate was added at a ratio of about 1 wt.% based on the polymer, the stability of the vinyl chloride-vinyl alcohol copolymer was increased.

The characteristics of the vinyl chloride-vinyl alcohol copolymer obtained by Hydrolysis 2 are as follows.

Vinyl chloride component: 78.9%
Vinyl acetate component: 0.4%
Vinyl alcohol component: 13.2%
Polymerization degree: $\bar{p}=350$ In both Hydrolyses 1 and 2, the stability of the polymers can be improved by incorporating in a step of the hydrolysis or the final step, a stabilizer such as a tin-type stabilizer as a dimer or trimer of di-n-octyl-tin-maleate, di-n-octyl tin-SS'-bis-isooctyl mercaptoacetate, dibutyltin-dilaurate or an epoxy type stabilizer (such as Eposizer-W-128 manufactured by Nippon Reichhold K.K.) a metal soap of Zn-Ca stearate or aminocrotonic acid ester.

In the resulting vinyl chloride-vinyl alcohol copolymer, the vinyl alcohol component imparts excellent affinity to the magnetic fine powder as the metal oxide and the acetyl groups are converted into hydroxyl groups to increase the glass transition temperature and the reactive hydroxyl groups are included so as to react with an isocyanate compound thereby forming easily a crosslinked structure. These properties are suitable for the main binder for the magnetic recording medium.

Certain examples for magnetic tapes prepared by using magnetic powder compositions comprising the resulting vinyl chloride-vinyl alcohol copolymer as a main binder and References for magnetic tapes prepared by using the conventional binder will be illustrated in comparison.

EXAMPLE 1

| | |
|---|---|
| $\gamma$-Fe$_2$O$_3$ acicular iron oxide: (major axis of 0.4$\mu$:minor axis of 0.05$\mu$) | 120 wt. parts |
| Vinyl chloride-vinyl alcohol copolymer: (a ratio of vinyl chloride to vinyl alcohol 88 to 20) (an average polymerization degree of 350) | 24 wt. parts |
| Methyl ethyl ketone (MEK): | 250 wt. parts |
| Methyl isobutyl ketone (MIBK): | 150 wt. parts |
| Polyurethane resin: (Nippolan 5033 (manufactured by Nippon Polyurethane Co.) dissolved in 45% ethylacetate-toluene at a solid concentration of 10.3 wt. %) | 22.9 wt. parts |

The components except $\gamma$-Fe$_2$O$_3$ were throughly mixed by a stirrer to dissolve the resins so as to prepare a lacquer. The lacquer and $\gamma$-Fe$_2$O$_3$ were charged in a ball mill and mixed for 24 hours to uniformly disperse $\gamma$-Fe$_2$O$_3$ powder.

The dispersion was admixed with 3 wt.parts of behenic acid and the powder was further dispersed for 1 hour to obtain a magnetic powder composition. The magnetic powder composition was coated on a polyester film and the coated product was processed to prepare a magnetic tape. This magnetic tape is referred to as Sample No. 1.

EXAMPLE 2

The magnetic powder composition of Example 1 was admixed with 8.6 wt.parts of a polyfunctional isocyanate polymer (Nippolan 2036 solid concentration of 60% manufactured by Nippon Polyurethane Co.) and the mixture was coated on a polyester film and heat-set at 80° C. for 4 hours to prepare a heat-set magnetic tape. This is referred to as Sample No. 2.

EXAMPLE 3

Vinyl chloride-vinyl alcohol copolymer prepared by Hydrolysis 2 as 25% solution of vinyl chloride-vinyl alcohol copolymer in a mixture of methyl isobutyl ketone and toluene was used.

| | |
|---|---|
| Vinyl chloride-vinyl alcohol copolymer: | 72 wt. parts |
| Butadiene-acrylonitrile copolymer: (Hica-1432 J. Nippon Zeon K. K.) | 1.5 wt. part |
| Polyurethane resin: (Esten 5702 manufactured by B. F. Goodrich Co.) | 10.5 wt. parts |
| Methyl ethyl ketone: | 250 wt. parts |
| Cyclohexanone: | 150 wt. parts |

The components were mixed to dissolve the resins to prepare a lacquer.

⅔ of the resulting lacquer was admixed with the following components.

| | |
|---|---|
| γ-Fe₂O₃ acicular powder (major axis of 0.4μ:minor axis of 0.5μ): | 120 wt. parts |
| Al₂O₃ fine powder (diameter of 0.2μ): | 3 wt. parts |
| Electroconductive carbon black: | 6 wt. parts |

The powders were uniformly dispersed in the lacquer by a sand-grind mill.

The mixture was admixed with 3 wt.parts of butyl myristate and 1 wt.parts of behenic acid and the powders were further dispersed to prepare a magnetic powder composition. This was coated on a polyester film and the coated product was processed to prepare a magnetic tape. This is referred to as Sample No. 3

EXAMPLE 4

The magnetic powder composition of Example 3 was admixed with 6 wt.parts of isocyanate (Colonate L manufactured by Nippon Polyurethane Co.) (a solid concentration of 75%) and the mixture was uniformly mixed to prepare a magnetic powder composition. This was coated on a polyester film and the coated product was processed to prepare a magnetic tape. This is referred to as Sample No. 4.

EXAMPLE 5

In accordance with the process of Example 4 except substituting butadiene-acrylonitrile copolymer by nitrocellulose obtained by removing the inpregnated isopropyl alcohol (H-½ second), a magnetic tape was prepared. This is referred as Sample No. 5

EXAMPLE 6

| | |
|---|---|
| Vinyl chloride-vinyl alcohol copolymer obtained by Hydrolysis 1: | 50 wt. parts |
| Polyurethane resin: (Esten 5702 manufactured by B. F. Goodrich Co. | 20 wt. parts |
| Thermoplastic linear polyhydroxypolyether-ester: (Epichlon H-351 manufactured by Dainippon Ink Color K. K.) | 30 wt. parts |
| Methyl ethyl ketone: | 250 wt. parts |
| Cyclohexanone: | 150 wt. parts |

The components were mixed by a mixer to dissolve the resins to prepare a lacquer. ⅔ of the resulting lacquer was admixed with the following components.

| | |
|---|---|
| γ-Fe₂O₃ acicular iron oxide fine powder: (major axis of 0.4μ:minor axis of 0.06μ) | 120 wt. parts |
| Silicon carbide: (SiC fine powder having a diameter of 0.2μ) | 4 wt. parts |

The powders were uniformly dispersed in the lacquer by a sand-grind mill.

The mixture was admixed with 3 wt.parts of butyl myristate and 1 wt.part of behenic acid and the powders were further dispersed to prepare a magnetic powder composition. Before coating the magnetic powder composition, 20 wt.parts of tridene diisocyanate (condensate of prepolymer and polyol) (Daltosec N 2280) manufactured by Nippon Polyurethane Co.) was added and the mixture was coated on a polyester film to prepare a magnetic tape. This is referred to as Sample No. 6.

In the present invention, polybutadiene or chlorinated rubber can be used instead of polyurethane elastomer or butadiene-acrylonitrile copolymer as an elastomer.

A thermoplastic resin such as low molecular weight polyesters such as Desmophenene #800, #1100 and #2200 (manufactured by Bayer Co.) which are usually used in a two-liquid type with an isocyanate; epoxy resins, phenoxy resins, chlorosulfonic polyethylenes, vinyl isobutyl ether resins, polyamides, polyvinyl butyral resins, and polyvinylpyrrolidone etc. can be also used as well as the linear saturated polyester used in Example 6, instead of said elastomer.

When a crosslinked structure is formed by hydroxyl groups of the binder, butylated melamine resin can be used as well as the polyfunctional isocyanate or the isocyanate-containing compound used in Examples 2 and 4.

The references will be illustrated.

REFERENCE 1

| | |
|---|---|
| Vinyl chloride-vinyl acetate copolymer: (VYHH manufactured by Union Carbide Co.) (Vinyl chloride component: 87%) (Vinyl acetate component: 13%) (Polymerization degree: 400) | 24 wt. parts |
| Polyurethane resin: (Nippolan 5033 manufactured by Nippon Polyurethane Co.) (45% ethyl acetate-toluene) | 229 wt. parts |
| Methyl ethyl ketone: | 250 wt. parts |
| Methyl isobutyl ketone | 150 wt. parts |

The components were throughly mixed to dissolve the resins so as to prepare a lacquer.

The lacquer and 120 wt.parts of γ-Fe₂O₃ acicular powder (major axis of 0.4μ: minor axis of 0.05μ) were charged in a ball mill and the mixture was mixed to uniformly disperse γ-Fe₂O₃ powder.

The dispersion was admixed with 3 wt.parts of behenic acid and the powder was further dispersed for 1 hour to obtain a magnetic powder composition. The magnetic powder composition was coated on a polyester film and the coated product was processed to prepare a magnetic tape. This magnetic tape is referred to as Sample No. 7.

REFERENCE 2

| | |
|---|---|
| Vinyl chloride-vinyl acetate-vinyl alcohol copolymer: (Vinyl chloride component: 91%) (Vinyl acetate component: 3%) (Vinyl alcohol component: 6%) (Average polymerization degree: 400) | 20 wt. parts |
| Butadiene-acrylonitrile copolymer: (Hica 1432J manufactured by Nippon Zeon K. K.) | 1.5 wt. parts |
| Polyurethane resin: (Esten 5702 manufactured by B. F. Goodrich Co.) | 10.5 wt. parts |
| Methyl ethyl ketone: | 250 wt. parts |
| Cyclohexanone: | 150 wt. parts |

The components were mixed to dissolve the resin to prepare a lacquer.

⅔ of the resulting lacquer was admixed with the following components.

| γ-Fe₂O₃ acicular powder: | 120 wt. parts |
|---|---|
| (major axis of 0.4μ:minor axis of 0.05μ) | |
| Al₂O₃ fine powder (diameter of 0.2μ): | 4 wt. parts |
| Electroconductive carbon black: | 6 wt. parts |

The powders were uniformly dispersed in the lacquer by a sand-grind mill.

The mixture was admixed with 3 wt.parts of butyl myristate and 1 wt.part of behenic acid and the powders were further dispersed to prepare a magnetic powder composition.

This was coated on a polyester film and the coated product was processed to prepare a magnetic tape. This is referred to as Sample No. 8.

REFERENCE 3

The magnetic powder composition of Reference 2 was admixed with 6 wt.parts of isocyanate (Colonate L manufactured by Nippon Polyurethane Co.) (a solid concentration of 75%) and the mixture was uniformly mixed to prepare a magnetic powder composition. This was coated on a polyester film and the coated product was heat-set at 80° C. for 48 hours to prepare a thermo-set magnetic tape. This is referred to as Sample No. 9.

In the preparations of Examples and References, the polyethyleneterephthalate film having a thickness of 9μ was used and each magnetic powder composition was coated to give a thickness of 6μ (dry). The surface was treated and smoothened.

Tests results of an orientation a running durability and an audio-sensitivity of each of the magnetic tapes Samples No. 1 to 9 are shown in Table 1.

The running durability test was carried out by a car stereo tape-recorder CX-1147P manufactured by Matsushita Tsushin Kogyo K.K. at an ambient temperature of 50° C. and a humidity of 70%RH.

The audio-sensitivity test was carried out by a cassette deck Nakamichi 1000 manufactured by Nakamichi Kenkyusho with a standard of Sample No. 8.

Samples No. 1 to No. 8 had a thickness of the magnetic powder composition of 6μ (dry) in a form of C-60 type magnetic tape.

The contents of vinyl chloride component, vinyl alcohol component and vinyl acetate components in the organic binders are referred by the references Vc, Va and Vac in Table 1.

TABLE 1

| Sample | | Vc | Va | Vac | Elastomer | Curing agent |
|---|---|---|---|---|---|---|
| Exp. | No. 1 | 86 | 12 | 2 | Urethane | |
| | No. 2 | 86 | 12 | 2 | Urethane | N2036 |
| | No. 3 | 85.5 | 14 | 0.5 | Urethane NBR | |
| | No. 4 | 85.5 | 12 | 0.5 | Urethane NBR | Colonate L |
| | No. 5 | 86 | 14 | 0 | Urethane nitrocellulose | Colonate L |
| | No. 6 | 86 | 14 | 0 | Urethane epoxy resin | |
| Ref. | No. 7 | 87 | 0 | 13 | Urethane | |
| | No. 8 | 91 | 6 | 3 | Urethane NBR | |
| | No. 9 | 91 | 6 | 3 | Urethane NBR | Colonate L |

TABLE 1'

| Sample | | Orientation | Running durability test | Audio-sensitivity (12.5KHz) | Audio-MOL 333Hz |
|---|---|---|---|---|---|
| Example | No. 1 | 2.10 | 100 hr. | +3.0 | +1.5 |
| | No. 2 | 2.10 | 200 hr. over | +4.0 | +2.0 |
| | No. 3 | 2.00 | 100 hr. | +3.0 | +1.0 |
| | No. 4 | 2.00 | 200 hr. over | +4.0 | +1.5 |
| | No. 5 | 2.20 | 200 hr. over | +4.0 | +1.5 |
| | No. 6 | 2.20 | 200 hr. over | +3.0 | +1.0 |
| Reference | No. 7 | 1.52 | 10 hr. running stop | −1.0 | −1.5 |
| | No. 8 | 1.70 | 5 hr. running stop | 0.0 | 0.0 |
| | No. 9 | 1.70 | 20 hr. running stop | +0.5 | +0.5 |

As it is clear from Table 1, the magnetic tapes of the present invention: Samples No. 1 to No. 6 had superior orientation, running durability and audio-sensitivity to those of the conventional magnetic tapes Samples No. 7 to No. 9.

When the vinyl chloride-vinyl alcohol copolymer is used as the main binder, the affinity of the binder to the magnetic iron oxide is remarkably improved and the orientation as a measure for dispersibility is remarkably improved and the surface uniformity of the magnetic tape is also improved in comparison with those of References. This fact is confirmed in view of the sensitivity at 12.5 KHz by the cassette deck and the audio MOL 333 Hz.

When a ratio of vinyl alcohol component Va is increased, Young's modulus of the magnetic powder coated membrane is improved. When an elastomer such as urethane or Hica is incorporated as desires, a magnetic powder membrane having high strength and flexibility can be formed. Therefore, in the severe running durability test at the ambient temperature of 50° C. and a humidity of 70%RH (high temperature and high humidity), the running durability can be 10 to 20 times of those of the conventional magnetic tapes.

When residual hydroxyl groups of vinyl alcohol component are crosslinked with a polyfunctional isocyanate, a magnetic powder membrane having higher strength can be formed whereby the magnetic tape having high durability for example the running durability at 50° C. and 70%RH (high temperature and high humidity) of longer than 200 hours can be obtained.

As described above, in accordance with the magnetic recording medium of the present invention, the substrate is coated with the magnetic powder composition comprising a magnetic powder and the organic binder having a main component of vinyl chloride-vinyl alcohol copolymer obtained by hydrolyzing acetyl group in vinyl acetate component of vinyl chloride-vinyl acetate copolymer. Therefore, the affinity of the organic binder to the fine magnetic powder is remarkably high whereby the magnetic recording medium having excellent dispersibility orientation and surface uniformity and high reliability and high durability can be obtained.

I claim:

1. A magnetic recording medium which comprises a substrate coated with a magnetic powder composition comprising a magnetic powder and an organic binder consisting essentially of as a main component (A) a copolymer consisting essentially of a vinyl chloride-vinyl alcohol copolymer, wherein said copolymer comprises less than 2 mole % of vinyl acetate component and 8 to 22 wt. % of vinyl alcohol component and wherein said vinyl chloride-vinyl alcohol copolymer is obtained by a hydrolysis of a vinyl chloride-vinyl acetate copolymer having a molar ratio of vinyl chloride component to vinyl acetate component of 85:15 to 70:30, with or without a stabilizer for the vinyl chloride-vinyl alcohol copolymer and (B) as a minor component at least one polymer which is an elastomer or soft thermoplastic resin or mixture thereof at a ratio of 50 to 10 wt. % based on the total organic binder.

2. The magnetic recording medium according to claim 1 wherein component B is an elastomer incorporated at a ratio of 50 to 10 wt. % based on the total organic binder.

3. The magnetic recording medium according to claim 2 wherein said organic binder is crosslinked with a compound which is reactive with hydroxyl group.

4. The magnetic recording medium according to claim 1 wherein component B is a soft thermoplastic resin incorporated at a ratio of 50 to 10 wt. % based on the total organic binder.

5. The magnetic recording medium according to claim 4 wherein said organic binder is crosslinked with a compound which is reactive with hydroxyl group.

6. The magnetic recording medium according to claim 1 wherein component B is a polyurethane elastomer incorporated at a ratio of 50 to 10 wt. % based on the total organic binder.

7. The magnetic recording medium according to claim 1 where said binder is crosslinked by a cross-linking agent which is a polyfunctional isocyanate or an isocyanate containing compound.

* * * * *